US011736183B2

(12) United States Patent
Choi et al.

(10) Patent No.: US 11,736,183 B2
(45) Date of Patent: Aug. 22, 2023

(54) WIRELESS REPEATER

(71) Applicant: Korea Electronics Technology Institute, Seongnam-si (KR)

(72) Inventors: Se Hwan Choi, Seongnam-si (KR); Kwang Ho Ahn, Yongin-si (KR)

(73) Assignee: Korea Electronics Technology Institute, Seongnam-si (KR)

(*) Notice: Subject to any disclaimer, the term of this patent is extended or adjusted under 35 U.S.C. 154(b) by 184 days.

(21) Appl. No.: 17/337,779

(22) Filed: Jun. 3, 2021

(65) Prior Publication Data

US 2021/0391915 A1 Dec. 16, 2021

(30) Foreign Application Priority Data

Jun. 10, 2020 (KR) ........................ 10-2020-0070001

(51) Int. Cl.
*H04B 7/155* (2006.01)
*H04B 7/0413* (2017.01)
(52) U.S. Cl.
CPC ........... *H04B 7/155* (2013.01); *H04B 7/0413* (2013.01)
(58) Field of Classification Search
CPC .. H04B 7/155; H04B 7/0413; H04B 7/15528; H04B 7/0617; H04B 7/086
See application file for complete search history.

(56) References Cited

U.S. PATENT DOCUMENTS

| | | | | |
|---|---|---|---|---|
| 11,418,253 B2 * | 8/2022 | Ashworth | ......... | H04W 74/0808 |
| 2013/0044650 A1 * | 2/2013 | Barker | ................ | H04B 7/0671 |
| | | | | 455/562.1 |
| 2018/0332372 A1 * | 11/2018 | Liu | ................. | H04B 10/25754 |
| 2020/0295799 A1 * | 9/2020 | Howard | ................. | H04B 7/043 |
| 2020/0314601 A1 * | 10/2020 | Hormis | ................. | H04B 7/155 |
| 2020/0382208 A1 * | 12/2020 | Hormis | ............... | H04B 7/1555 |

FOREIGN PATENT DOCUMENTS

| | | | | |
|---|---|---|---|---|
| EP | 3244488 A1 * | 11/2017 | ............. | H01Q 25/00 |
| KR | 10-2009-0117196 A | 11/2009 | | |
| KR | 10-2011-0032229 A | 3/2011 | | |
| KR | 10-1809383 B1 | 12/2017 | | |
| WO | WO-0152447 A2 * | 7/2001 | ............. | G01S 19/11 |

OTHER PUBLICATIONS

Mostafa, Hefnawi., "Hybrid Beamforming for Millimeter-Wave Heterogeneous Networks", *Department of Electrical and Computer Engineering, Royal Military College of Canada*, Jan. 28, 2019 (10 pages in English).
Korean Office Action dated Apr. 20, 2021 in counterpart Korean Patent No. 10-2020-0070001 (3 pages in English and 4 pages in Korean).

* cited by examiner

*Primary Examiner* — Habte Mered
(74) *Attorney, Agent, or Firm* — NSIP Law

(57) ABSTRACT

A repeater is provided. The repeater includes: a hybrid butler matrix configured to perform beamforming of a MIMO antenna for transmitting and receiving a base station signal; a hybrid butler matrix configured to perform beamforming of a MIMO antenna for transmitting and receiving a user terminal signal; and a signal processor configured to amplify a signal to be transmitted and received through the hybrid butler matrix. Accordingly, it is easy to manufacture a repeater, heat emission and power consumption can be reduced, and a cost of production can be reduced.

20 Claims, 15 Drawing Sheets

|  | A1 | A2 | A3 | A4 | Increase/ Decrease |
|---|---|---|---|---|---|
| L2 | 45 | −180 | −45 | 90 | +135 |
| L1 | 0 | 45 | 90 | 135 | +45 |
| R1 | 135 | 90 | 45 | 0 | −45 |
| R2 | 90 | −45 | −180 | 45 | −135 |

FIG. 10

|  | A1 | A2 | A3 | A4 | B1 | B2 | B3 | B4 | AB Phase Difference |
|---|---|---|---|---|---|---|---|---|---|
| HL2 | 45 | −180 | −45 | 90 | 225 | 0 | 135 | 270 | +180 |
| HL1 | 0 | 45 | 90 | 135 | 180 | 225 | 270 | 315 | +180 |
| HR1 | 135 | 90 | 45 | 0 | −45 | −90 | −135 | −180 | −180 |
| HR2 | 90 | −45 | −180 | 45 | −90 | −225 | 0 | −135 | −180 |

FIG. 11

|  | Pass-1 | Phase Shifter-1 | Pass-2 | Phase Shifter-2 |
|---|---|---|---|---|
| HL1 | L1 | 0 | L1 | 180 |
| HL2 | L2 | 0 | L2 | 180 |
| HR1 | R1 | 180 | R1 | 0 |
| HR2 | R2 | 180 | R2 | 0 |
| B1 | L1 | 0 | L1 | 90 |
| B2 | L1 | 0 | R1 | 0 |
| B3 | L1 | 0 | R1 | 180 |
| B4 | L1 | 0 | L1 | 0 |
| B5 | L2 | 0 | R2 | 0 |
| B6 | L2 | 0 | R2 | 180 |

FIG. 12

WIRELESS REPEATER

CROSS-REFERENCE TO RELATED APPLICATION(S) AND CLAIM OF PRIORITY

This application is based on and claims priority under 35 U.S.C. § 119 to Korean Patent Application No. 10-2020-0070001, filed on Jun. 10, 2020, in the Korean Intellectual Property Office, the disclosure of which is herein incorporated by reference in its entirety.

BACKGROUND

Field

The present disclosure relates generally to wireless communication technology, and more particularly, to a structure of a repeater which can extend a communication coverage area in 5G wireless communications.

Description of Related Art

FIGS. 1 and 2 are views illustrating an operation principle and a detailed structure of a normal repeater. As shown in the drawings, the repeater performs the role of extending a communication service area by amplifying a weak signal received from a base station and transmitting the signal.

In an existing superhigh frequency band of 6 GHz or less, loss caused when signals penetrate through a glass window is nominal, and accordingly, when a repeater is installed close to a glass window as shown in FIG. 1, a communication service area in a building may be extended.

However, in a band of 6 GHz or higher or a millimeter wave band used in 5G mobile communications, signals do not almost penetrate through a glass window as shown in FIG. 2.

To this end, an antenna (donor) should be installed outside a building, and an inside antenna of the building and a transceiver should be connected via a cable as shown in FIG. 4. Accordingly, it may be difficult to install a repeater due to connection of a power line, a signal line, and there may be problems of an increased cost and disfiguration.

The structure of the repeater illustrated in FIG. 4 is illustrated in FIG. 5 in detail. The repeater typically includes an amplifier for amplifying signals and a band pass filter.

In a 5G environment using millimeter-wave bands, beamforming and multiple input and multiple output (MIMO) functions should be essentially applied to the repeater to solve loss in the air and to enhance a communication speed.

To support MIMO in a 5G repeater, 64 or more antennas in total, which equals to 8×8, are typically required, and, to implement beamforming, a phase shifter, a low noise amplifier (LNA), a power amplifier (PA), etc. may be required for each antenna.

FIG. 6 illustrates a related-art beamforming system, and, as can be seen from the illustrated structure, a phase shifter for changing a shift is required for each sub-array to implement beamforming, and also, it can be seen that a low noise amplifier or a power amplifier for amplifying signals is required for each transceiving path.

FIG. 7 illustrates a structure of a related-art beamforming module chip. Since eight or more phase shifters are provided in one chip, one chip can change phases of four antennas, and 16 chips (128 phase shifters) may be required to implement beamforming of an 8×8 array antenna.

Accordingly, due to problems of heat emission, caused by increased beamforming modules and amplifier according to the increased number of antennas, high power consumption, and spatial restriction in implementation of a system, it may be difficult to implement a repeater for 5G communications.

SUMMARY

To address the above-discussed deficiencies of the prior art, it is a primary object of the present disclosure to provide a repeater which provides a beamforming function by using a hybrid butler matrix, as a solution for enhancing easiness of manufacturing, reducing heat emission and power consumption, and reducing a cost of production.

In addition, another object of the present disclosure is to provide a repeater which utilizes a magnet and a wireless charging technique, as a solution for solving problems of difficulty in installing, caused by connection of a power line, a signal line when a repeater is implement for communications using millimeter waves, an increased cost, and disfiguration.

According to an embodiment of the present disclosure to achieve the above-described objects, a repeater includes: a first hybrid butler matrix configured to perform beamforming of a MIMO antenna for transmitting and receiving a base station signal; a second hybrid butler matrix configured to perform beamforming of a MIMO antenna for transmitting and receiving a user terminal signal; and a signal processor configured to amplify a signal to be transmitted and received through the first hybrid butler matrix and the second hybrid butler matrix.

The first hybrid butler matrix may include: a hybrid butler matrix configured to receive a signal from a base station; and a hybrid butler matrix configured to transmit a signal to the base station, and the second hybrid butler matrix may include: a hybrid butler matrix configured to receive a signal from a user terminal; and a hybrid butler matrix configured to transmit a signal to the user terminal.

The signal processor may include: a downlink signal processor configured to amplify a downlink signal received from the first hybrid butler matrix, and to transmit the amplified signal to the second hybrid butler matrix; and an uplink signal processor configured to amplify an uplink signal received from the second hybrid butler matrix, and to transmit the amplified signal to the first hybrid butler matrix, and the repeater may include: a first circulator configured to selectively connect the first hybrid butler matrix to the downlink signal processor or the uplink signal processor; and a second circulator configured to selectively connect the second hybrid butler matrix to the downlink signal processor or the uplink signal processor.

The first hybrid butler matrix may be provided in an external module positioned on an outdoor area, and the second hybrid butler matrix may be provided in an internal module positioned on an indoor area, and the repeater may further include: an external magnet provided in the external module to be coupled with an internal magnet provided in the internal module; and an internal magnet provided in the internal module to be coupled with the external magnet provided in the external module.

The external magnet may include: an upper magnet positioned on an upper portion of the external module; and a lower magnet positioned on a lower portion of the external module, and the internal magnet may include: an upper internal magnet positioned on an upper portion of the internal module; and a lower internal magnet positioned on a lower portion of the internal module.

The signal processor may include: an external signal processor provided in the external module; and an internal signal processor provided in the internal module, and the external signal processor and the internal signal processor may be respectively provided with one antenna for transmitting a downlink signal and one antenna for transmitting an uplink signal.

The signal processor may include: an external signal processor provided in the external module; and an internal signal processor provided in the internal module, and the external signal processor and the internal signal processor may be respectively provided with one antenna for transmitting a signal to each other.

The repeater may further include: a power supply provided in the external module to supply power to the external module; a wireless power transmission module provided in the external module to wirelessly transmit power supplied by the power supply; and a wireless power reception module provided in the internal module to receive power from the wireless power transmission module and to supply power to the internal module.

The external module may be positioned on an outside of a glass window of a building, and the internal module may be positioned on an inside of the glass window of the building.

According to another embodiment of the present disclosure, a repeating method includes: performing, by a first hybrid butler matrix, beamforming of a MIMO antenna for transmitting and receiving a base station signal; performing, by a second hybrid butler matrix, beamforming of a MIMO antenna for transmitting and receiving a user terminal signal; and amplifying, by a signal processor, a signal to be transmitted and received through the first hybrid butler matrix and the second hybrid butler matrix.

According to still another embodiment of the present disclosure, a repeater includes: a first hybrid butler matrix configured to perform beamforming of a MIMO antenna for transmitting and receiving a first signal; a second hybrid butler matrix configured to perform beamforming of a MIMO antenna for transmitting and receiving a second signal; a signal processor configured to amplify a signal to be transmitted and received through the first hybrid butler matrix and the second hybrid butler matrix; and a controller configured to control beamforming of the first hybrid butler matrix and the second hybrid butler matrix.

According to yet another embodiment of the present disclosure, a repeating method includes: controlling, by a controller, beamforming of a first hybrid butler matrix and a second hybrid butler matrix; performing, by the first hybrid butler matrix, beamforming of a MIMO antenna for transmitting and receiving a first signal; performing, by the second hybrid butler matrix, beamforming of a MIMO antenna for transmitting and receiving a second signal; and amplifying, by a signal processor, a signal to be transmitted and received through the first hybrid butler matrix and the second hybrid butler matrix.

According to embodiments of the present disclosure as described above, a beamforming function is provided by using a hybrid butler matrix, so that easiness of manufacturing can be provided, heat emission and power consumption can be reduced, and a cost of production can be reduced.

In addition, according to various embodiments of the present disclosure, by utilizing magnets and wireless charging techniques, problems of difficulty in installing due to connection of power lines, signal lines when a repeater for communication using millimeter waves is implemented, an increased cost, and disfiguration can be solved.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 is a table illustrating phase values of antennas according to selection of ports of the butler matrixes;

FIGS. 11 and 12 are tables showing selected ports of butler matrixes for setting an array factor, and phase shift angles of phase shifters;

DETAILED DESCRIPTION

Hereinafter, the present disclosure will be described in detail with reference to the accompanying drawings.

Figure 1:
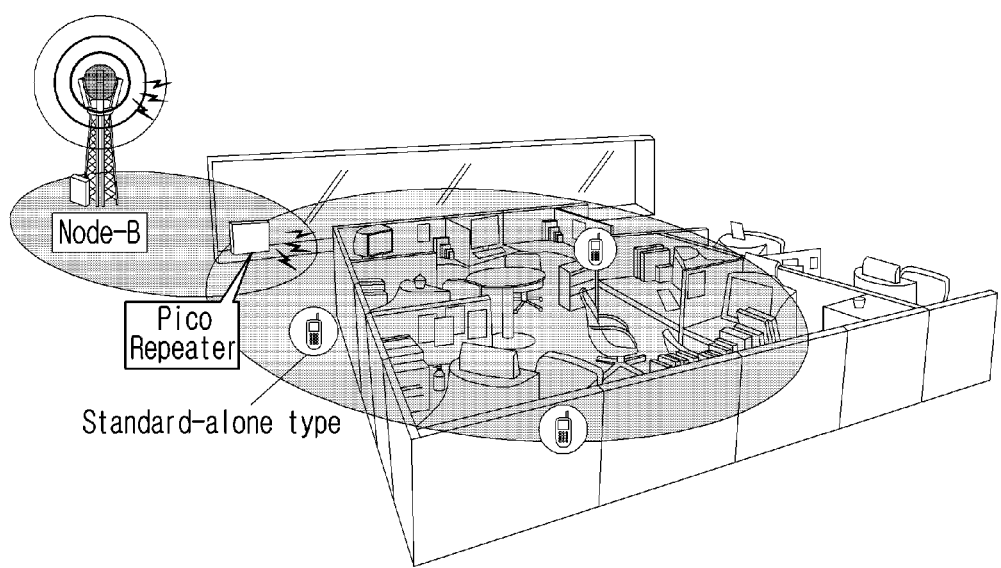
FIG. 1 is a view illustrating an operation principle of a normal repeater.
Figure 2:
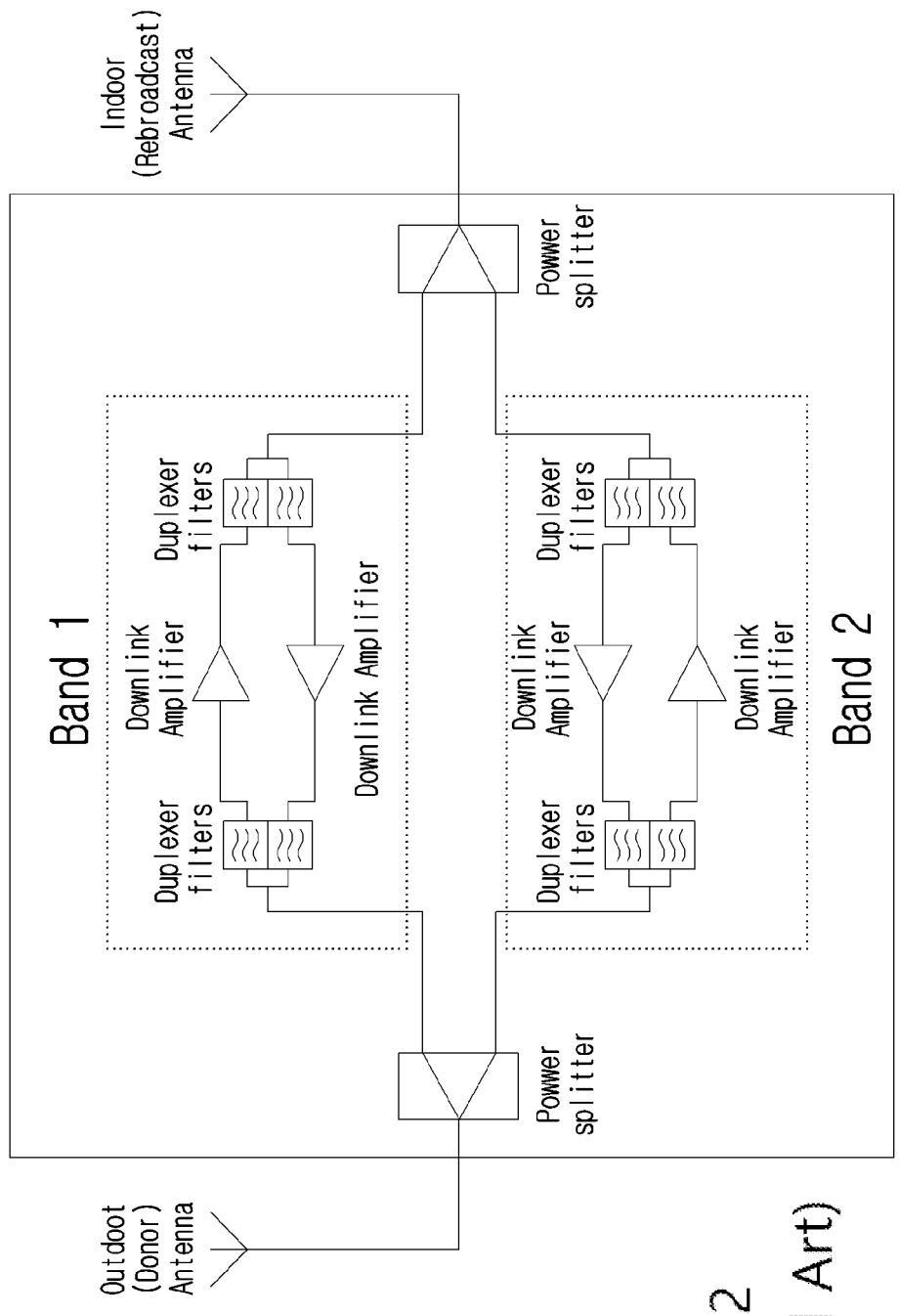
FIG. 2 is a view illustrating a detailed structure of the repeater shown in FIG. 1.
Figure 3:
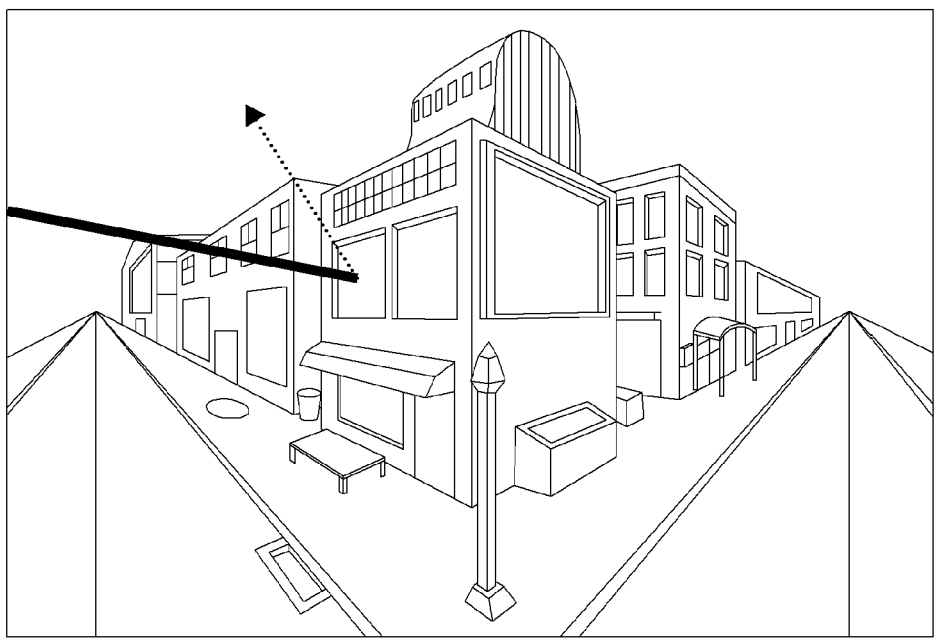
FIG. 3 is a view illustrating problems in 5G mobile communications.
Figure 4:
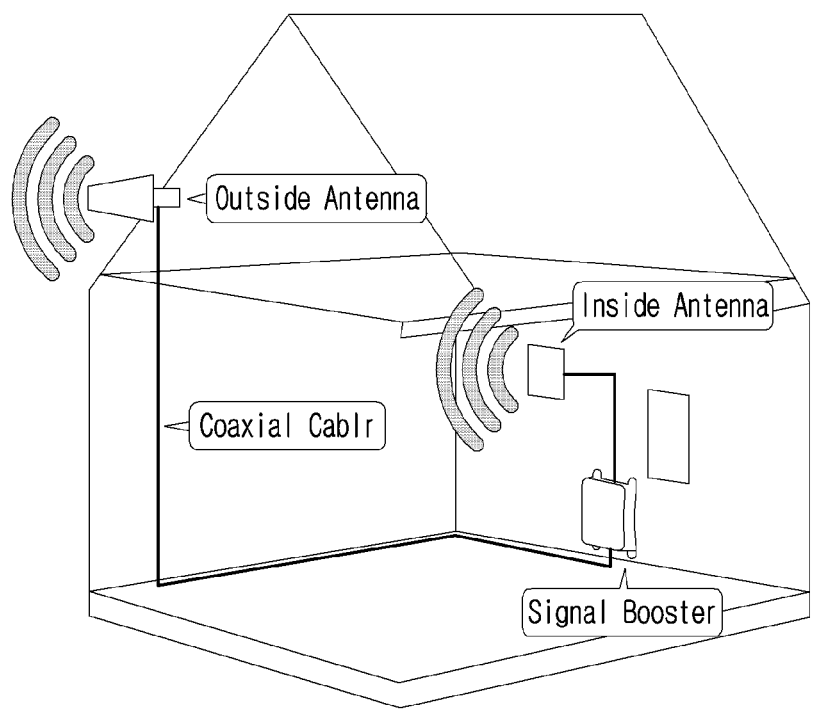
FIG. 4 is a view illustrating a structure of a repeater having an antenna installed outside a building.
Figure 5:
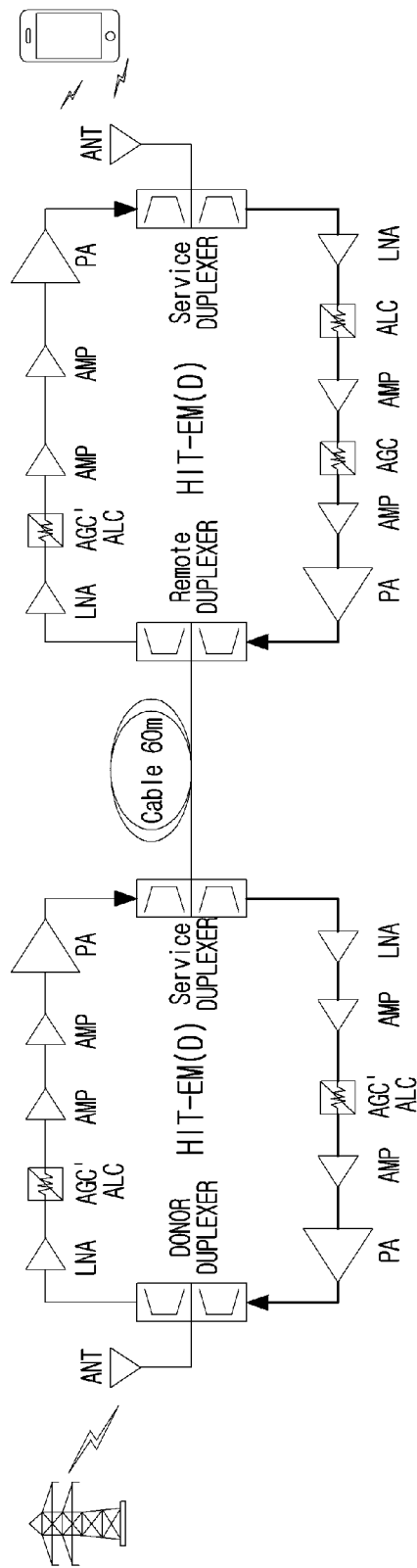
FIG. 5 is a view illustrating the structure of the repeater of FIG. 4 in detail.
Figure 6:
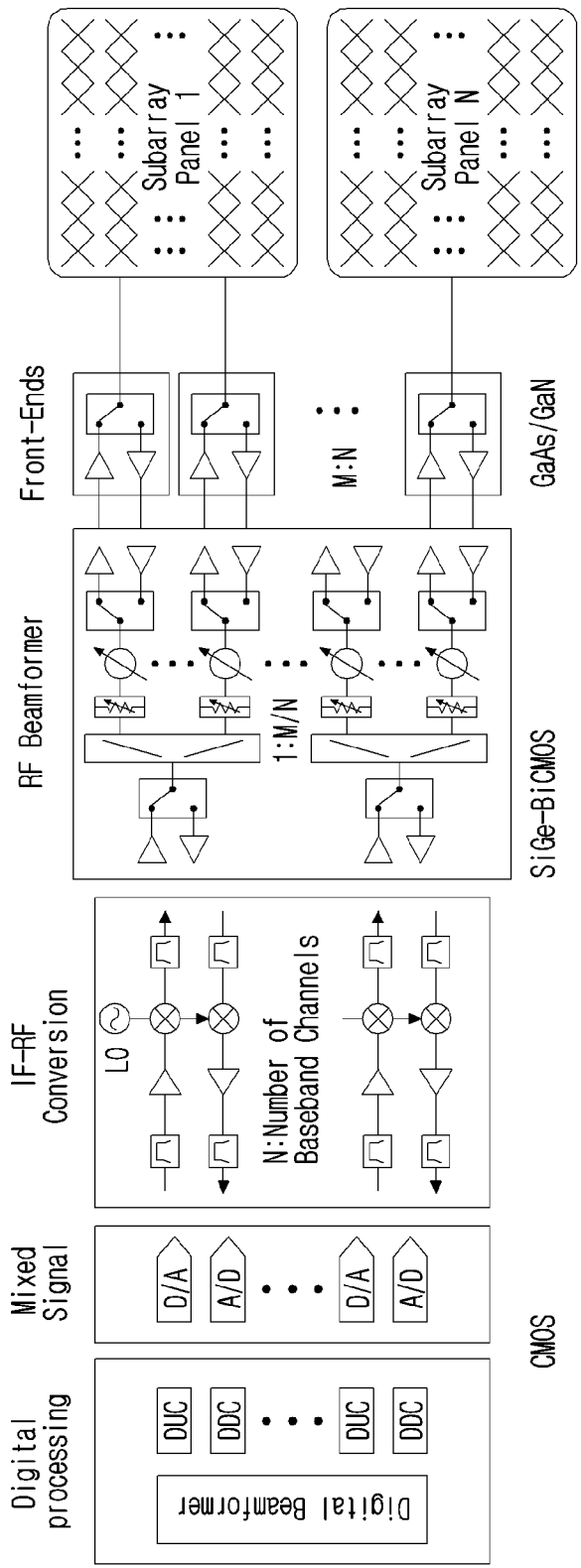
FIG. 6 is a view illustrating a structure of a related-art beamforming system.
Figure 7:
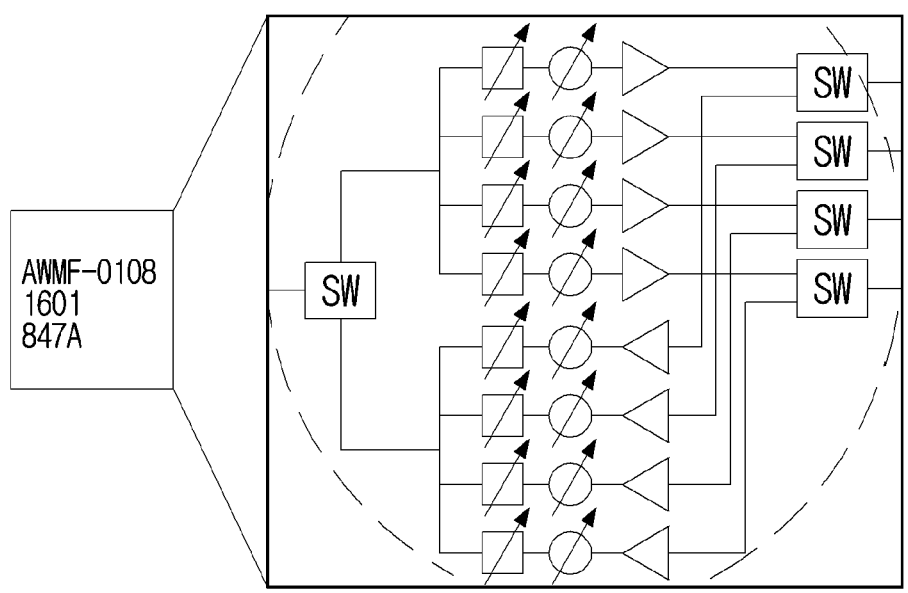
FIG. 7 is a view illustrating a structure of a related-art beamforming module chip.
Figure 8:
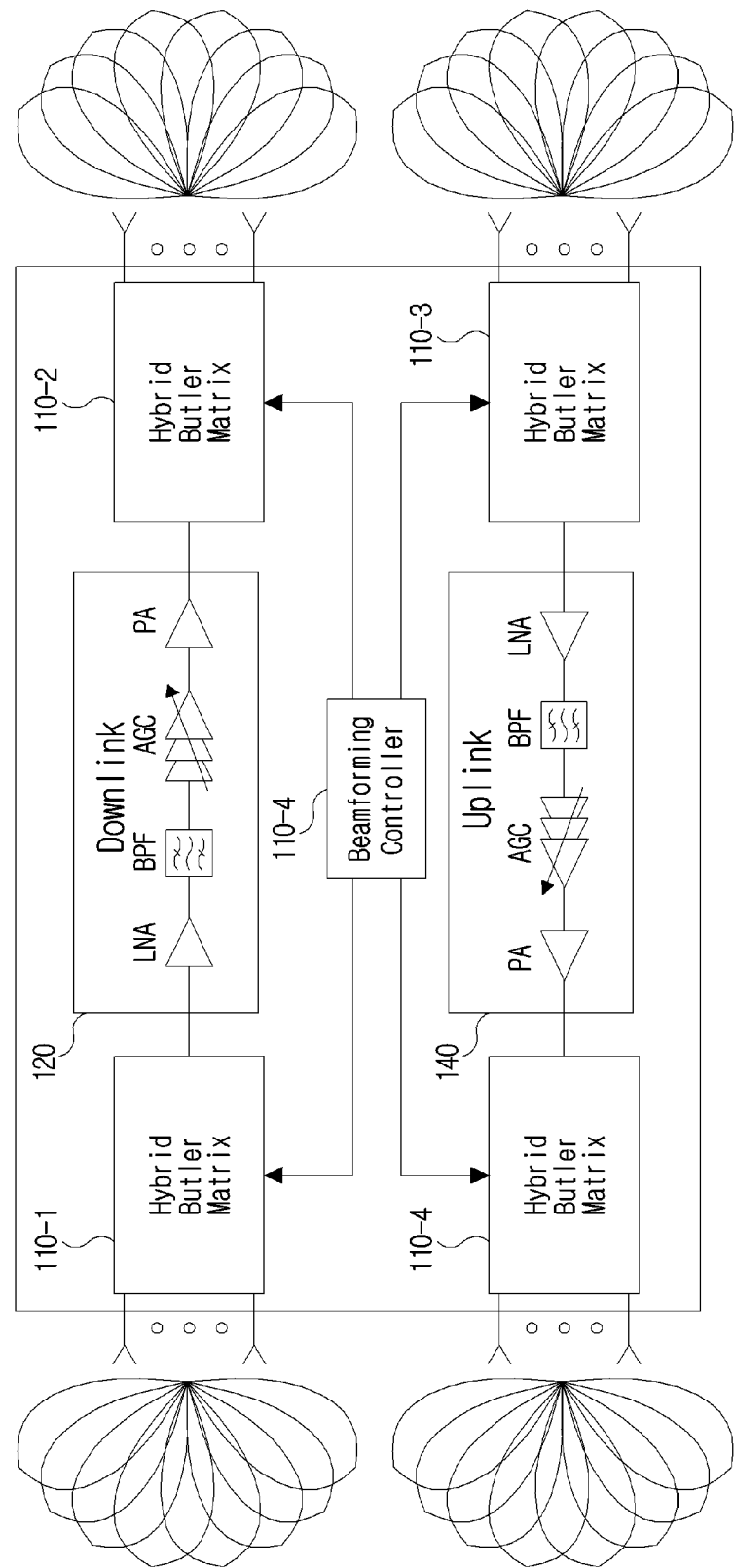
FIG. 8 is a view illustrating a structure of a repeater according to an embodiment of the present disclosure.

FIG. 8 is a view illustrating a structure of a repeater according to an embodiment of the present disclosure. The repeater according to an embodiment may include hybrid butler matrixes 110-1, 110-2, 110-3, 110-4, a downlink signal processor 120, a beamforming controller 130, and an uplink signal processor 140.

The hybrid butler matrixes 110-1, 110-2, 110-3, 110-4 may perform beamforming of a multi input multi output (MIMO) antenna system, and may be controlled by the beamforming controller 130.

The downlink signal processor 120 may amplify a base station signal received by the hybrid butler matrix-1 110-1, and may transmit the amplified signal to a user terminal through the hybrid butler matrix-2 110-2.

The uplink signal processor 140 may amplify a signal of a user terminal received by the hybrid butler matrix-3 110-3, and may transmit the amplified signal to a base station through the hybrid butler matrix-4 110-4.

Hereinafter, the hybrid butler matrixes 110-1, 110-2, 110-3, 110-4 will be described in detail with reference to FIG. 9.

Figure 9:
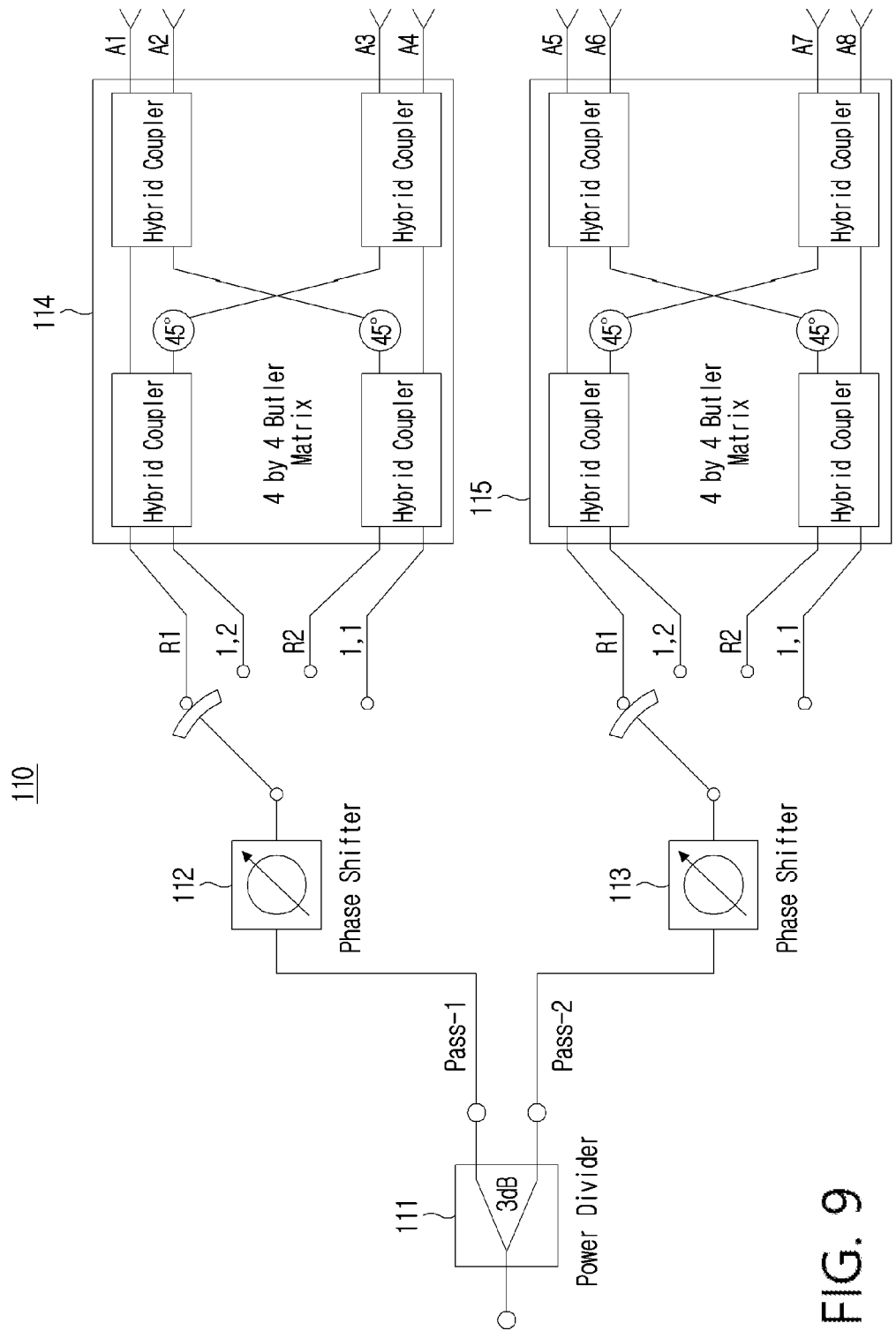
FIG. 9 is a view illustrating detailed structures of hybrid butler matrixes shown in FIG. 8.

FIG. 9 is a view illustrating detailed structures of the hybrid butler matrixes 110-1, 110-2, 110-3, 110-4 shown in FIG. 8. Since the detailed structures of the hybrid butler matrixes 110-1, 110-2, 110-3, 110-4 are implemented in the same way, FIG. 9 illustrates only one hybrid butler matrix as a representative by using reference numeral "110."

As shown in FIG. 9, the hybrid butler matrix may include a power coupler/divider 111, a phase shifter-1 112, a phase shifter-2 113, a butler matrix-1 114, and a butler matrix-2 115.

The power divider 111 provided in the hybrid butler matrix-2/4 110-2/110-4 which transmits signals may divide power of a signal received from the downlink/uplink signal processor 120/140, and may transmit the divided power to the phase shifter-1 112 and the phase shifter-2 113.

The phase shifter-1 112 may shift a phase of the signal applied from the power divider 111, and may transmit the signal to the butler matrix-1 114, and the phase shifter-2 113 may shift a phase of the signal applied from the power divider 111, and may transmit the signal to the butler matrix-2 115.

The butler matrix-1 114 may be a 4×4 butler matrix, and may select one of four ports R1, L2, R2, L1, may receive the signal the phase of which is shifted at the phase shifter-1 112, and may transmit the signal through a plurality of antennas A1, A2, A3, A4.

Radiation patterns of the antennas A1, A2, A3, A4 may be determined according to a port of the butler matrix-1 114 which receives the signal phase of which is shifted at the phase shifter-1 112.

The butler matrix-2 115 may also be a 4×4 butler matrix, and may select one of four ports R1, L2, R2, L1, may receive the signal the phase of which is shifted at the phase shifter-2 113, and may transmit the signal through a plurality of antennas A5, A6, A7, A8.

Radiation patterns of the antennas A5, A6, A7, A8 may be determined according to a port of the butler matrix-2 115 which receives the signal phase of which is shifted at the phase shifter-2 113.

The port that is selected to receive a signal at the butler matrix-1 114, and the port that is selected to receive a signal at the butler matrix-2 115 may be the same as each other or may be different from each other, which will be described in detail below.

The butler matrix-1 114 provided in the hybrid butler matrix-1/3 110-1/110-3 which receives signals may also be a 4×4 butler matrix, and may select one of four ports R1, L2, R2, L1, and may transmits signals received through the plurality of antennas A1, A2, A3, A4 to the phase shifter-1 112.

Radiation patterns of the antennas A1, A2, A3, A4 may be determined according to a port of the butler matrix-1 114 which transmits signals to the phase shifter-1 112.

The butler matrix-2 115 may be a 4×4 butler matrix, and may select one of four ports R1, L2, R2, L1 and may transmit signals received through the plurality of antennas A5, A6, A7, A8 to the phase shifter-2 113.

Radiation patterns of the antennas A5, A6, A7, A8 may be determined according to a port of the butler matrix-2 115 which transmits signals to the phase shifter-2 113.

The port that is selected to transmit a signal at the butler matrix-1 114, and the port that is selected to transmit a signal at the butler matrix-2 115 may be the same as each other or may be different from each other.

The power coupler 111 may couple power transmitted from the phase shifter-1 112 and the phase shifter-2 113, and may transmit the coupled power to the downlink/uplink signal processor 120/140.

FIG. 10 is a table showing phase values of antennas according to selection of ports of a butler matrix-1 131 and a butler matrix-2 132 which are 4×4 matrixes.

FIGS. 11 and 12 are tables showing a selected port of the butler matrix-1 114 for setting an array factor, a phase shift angle of the phase shifter-1 112, a selected port of the butler matrix-2 115, a phase shift angle of the phase shifter-2 113.

One hybrid butler matrix implements a beamforming function for 8 antennas. Accordingly, when beamforming of an 8×8 array antenna is implemented by the hybrid butler matrix, 16 butler matrixes and 16 phase shifters are required and only two amplifiers are required. That is, when the hybrid butler matrix is used as described above, complexity in implementing a repeater can be dramatically reduced.

5G communications should support time division duplex (TDD) rather than an existing frequency division duplexing (FDD) method. In LTE which is an FDD method, transmission and reception frequencies may be distinguished by using a duplexer, but transmission and reception should be distinguished by using a switch in a TDD method.

However, since it is difficult to control timing of a switch in implementing a repeater, an antenna for transmitting and an antenna for receiving should be distinguished to transmit and receive signals always. Accordingly, there is a problem that a transmission beamforming module and a reception beamforming module should be separately used as beamforming modules.

However, this problem may be overcome by using a circulator having high isolation. A structure of a repeater applying the same is suggested in FIG. 13.

Figure 13:
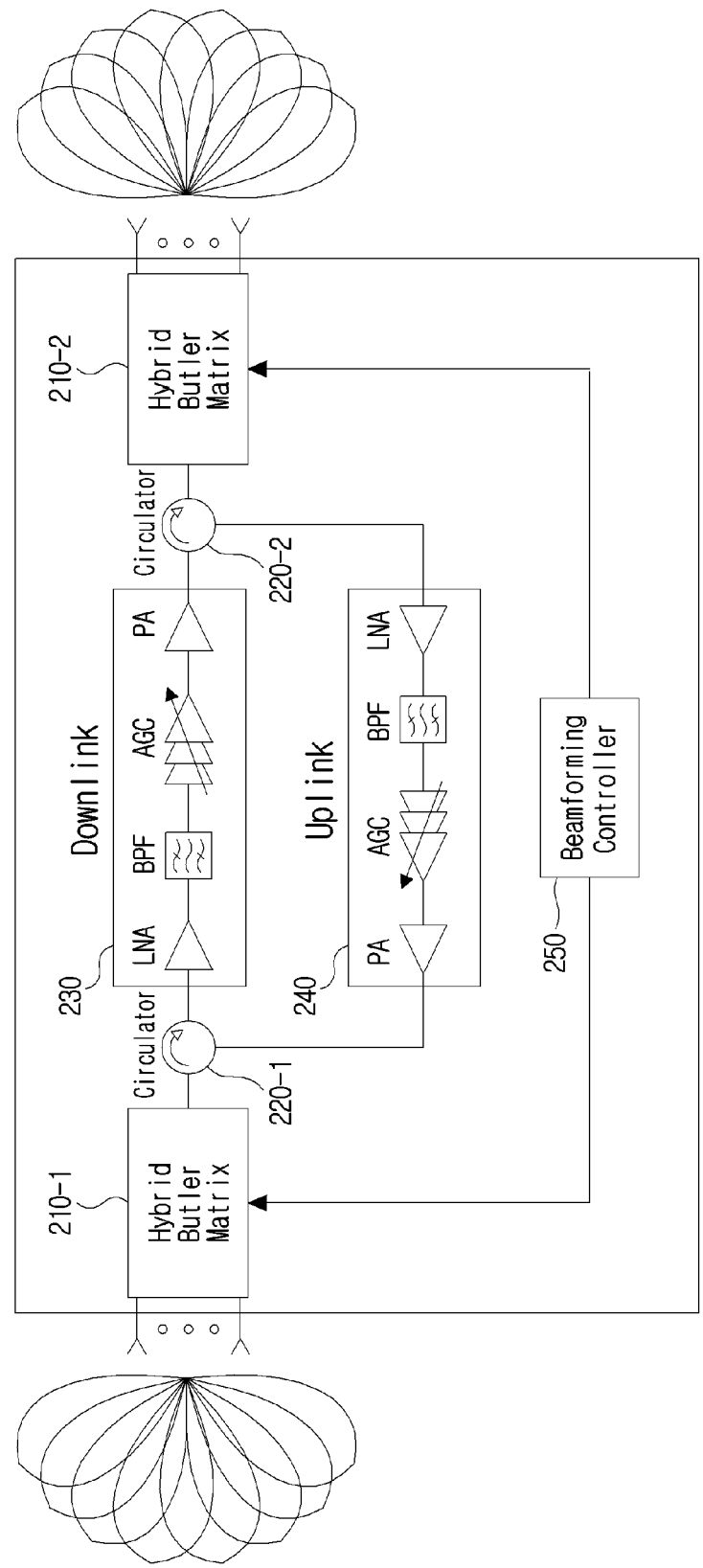
FIG. 13 is a view illustrating a structure of a repeater according to another embodiment of the present disclosure.

FIG. 13 is a view illustrating a structure of a repeater according to another embodiment of the present disclosure. The repeater according to an embodiment may include hybrid butler matrixes 210-1, 210-2, circulators 220-1, 220-2, a downlink signal processor 230, an uplink signal processor 240, and a beamforming controller 250.

The hybrid butler matrix-1 210-1 may be a means for performing beamforming of a MIMO antenna system for receiving a signal from a base station or for transmitting a signal to the base station, and may be controlled by the beamforming controller 250.

The circulator-1 220-1 may be a switching means for selectively connecting the hybrid butler matrix-1 210-1 to the downlink signal processor 230 or to the uplink signal processor 240.

The hybrid butler matrix-2 210-2 may be a means for performing beamforming of a MIMO antenna system for receiving a signal from a user terminal or for transmitting a signal to the user terminal, and may be controlled by the beamforming controller 250.

The circulator-2 220-2 may be a switching means for selectively connecting the hybrid butler matrix-2 210-2 to the downlink signal processor 230 or the uplink signal processor 240.

In a downlink section, the circulators 220-1, 220-2 may connect the hybrid butler matrixes 210-1, 210-2 to the downlink signal processor 230. Accordingly, a base station signal received through the hybrid butler matrix-1 210-1 may be amplified at the downlink signal processor 230, and may be transmitted to a user terminal through the hybrid butler matrix-2 210-2.

In an uplink section, the circulators 220-1, 220-2 may connect the hybrid butler matrixes 210-1, 210-2 to the uplink signal processor 240. Accordingly, a user terminal signal received through the hybrid butler matrix-2 210-2 may be amplified at the uplink signal processor 240, and may be transmitted to a base station through the hybrid butler matrix-1 210-1.

Figure 14:
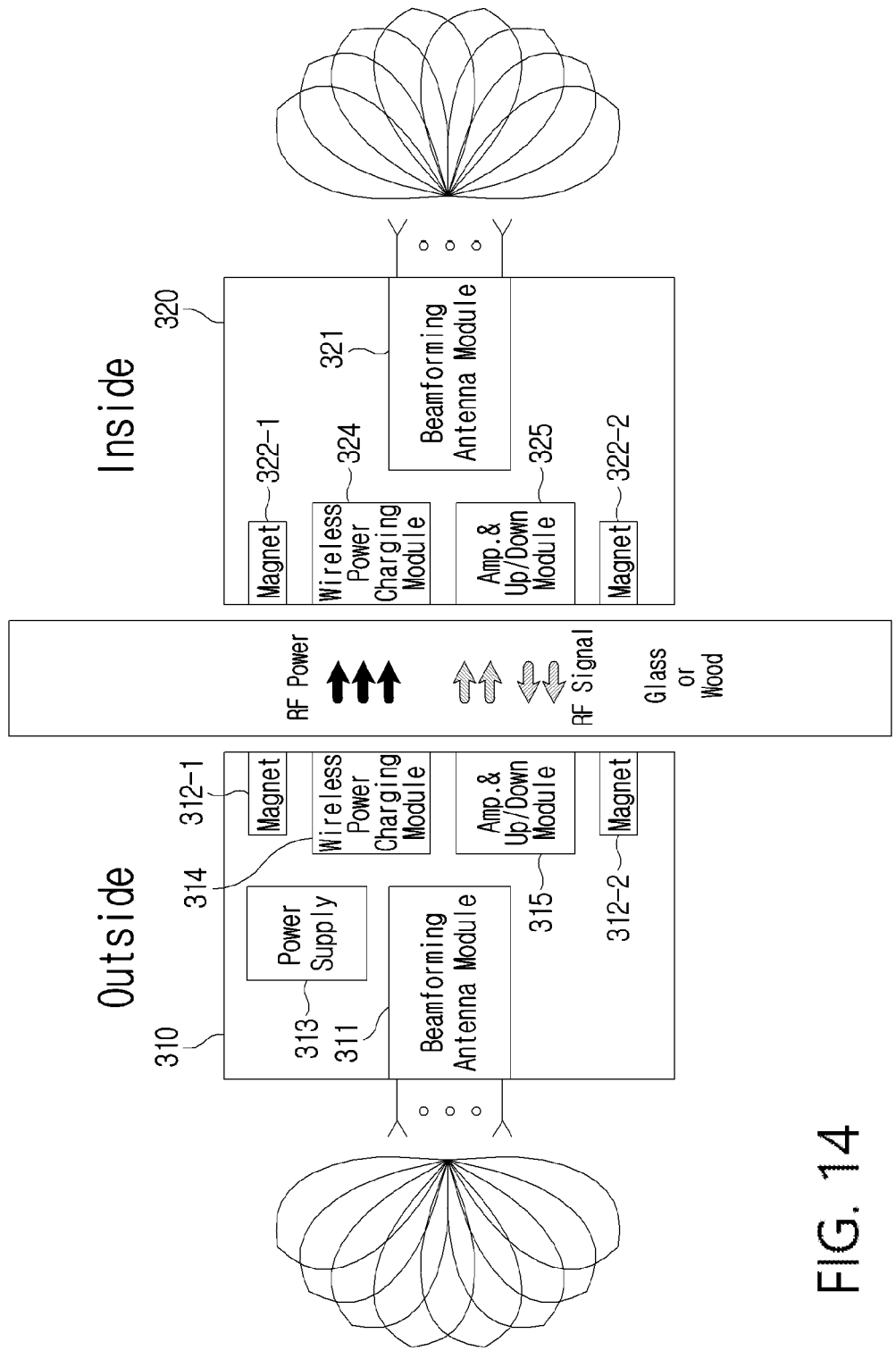
FIG. 14 is a block diagram of a repeater according to still another embodiment of the present disclosure.

FIG. 14 is a block diagram of a repeater according to still another embodiment of the present disclosure. The repeater according to an embodiment may include an external module 310 installed outside a glass window (or a thin wall) of a building, and an internal module 320 installed inside the glass window of the building.

The external module 310 may include a beamforming antenna module 311, upper/lower magnets 312-1/312-2, a power supply 313, a wireless power transmission module 314, and an uplink/downlink signal processor 315.

In addition, the internal module 320 may include a beamforming antenna module 321, upper/lower magnets 322-1/322-2, a wireless power reception module 324, an uplink/downlink signal processor 325.

The beamforming antenna module 311 of the external module 310, which is a module for performing beamforming of a MIMO antenna system for transmitting/receiving a signal to/from a base station, may be controlled by a beamforming controller (not shown). The beamforming antenna module 311 may be implemented by the above-described hybrid butler matrix.

The beamforming antenna module 321 of the internal module 320, which is a module for performing beamforming of a MIMO antenna system for transmitting/receiving a signal to/from a user terminal, may be controlled by a beamforming controller (not shown). The beamforming antenna module 321 may be implemented by the above-described hybrid butler matrix.

The uplink/downlink signal processor 315 of the external module 310 may amplify a base station signal received through the beamforming antenna module 311, and may wirelessly transmit the amplified signal to the uplink/downlink signal processor 325 of the internal module 320. Then, the uplink/downlink signal processor 325 may amplify the received signal and may transmit the signal to a user terminal through the beamforming antenna module 321 of the internal module 320.

The uplink/downlink signal processor 325 of the internal module 320 may amplify a user terminal signal received through the beamforming antenna module 321, and may wirelessly transmit the amplified signal to the uplink/downlink signal processor 315 of the external module 310. Then, the uplink/downlink signal processor 315 may amplify the received signal and may transmit the signal to a base station through the beamforming antenna module 311 of the external module 310.

Figure 15:
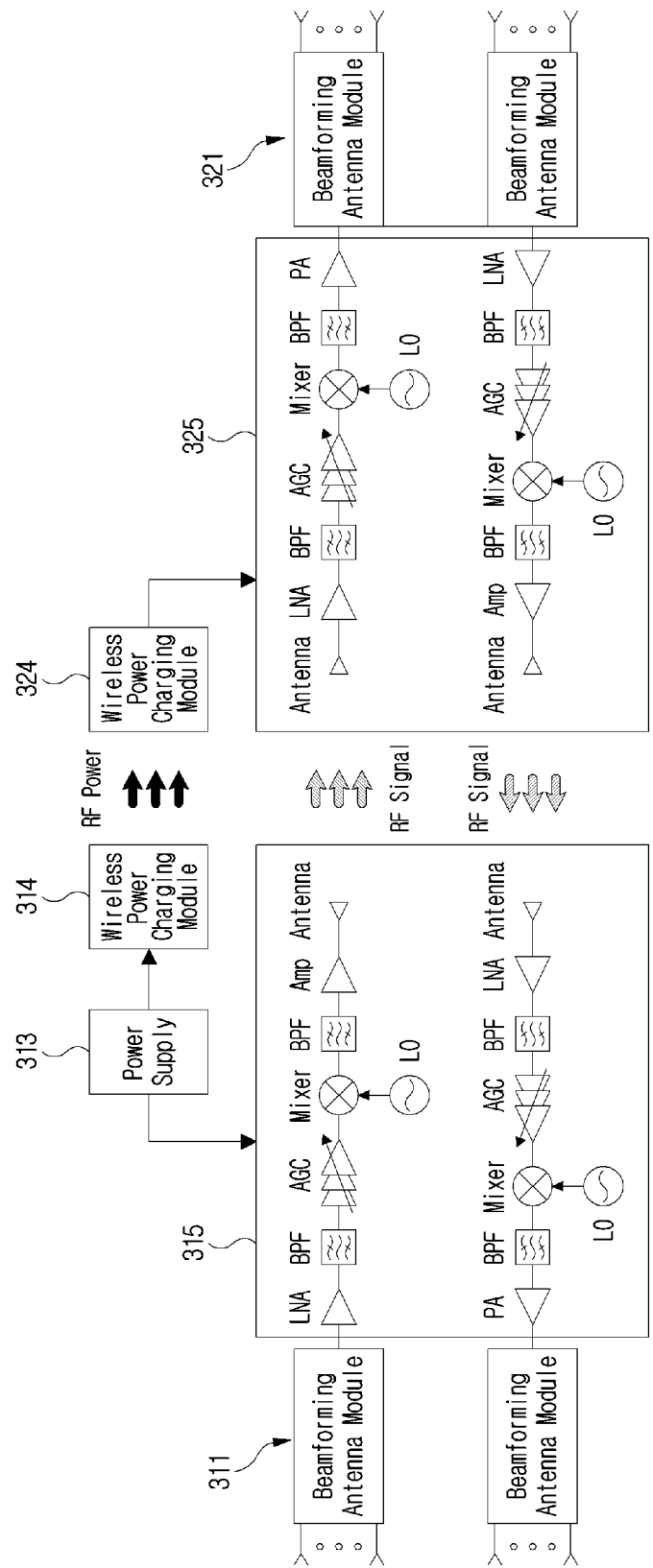
FIG. 15 is a view illustrating detailed structures of a beamforming antenna module and an uplink/downlink signal processor shown in FIG. 14.

FIG. 15 illustrates detailed structures of the beamforming antenna module 311, the uplink/downlink signal processor 325, the beamforming antenna module 321, and the uplink/downlink signal processor 325.

As shown in the drawing, a plurality of beamforming antenna modules 311 and a plurality of beamforming antenna modules 321 may be implemented according to communication specifications. In addition, the uplink/downlink signal processors 315, 325 may include a frequency up/down conversion means, in addition to the amplification means for amplifying transmission and reception signals.

In addition, the uplink/downlink signal processors 315, 325 may be provided with antennas for exchanging signals with each other, respectively. In FIG. 15, it is assumed that two antennas are provided in each of the uplink/downlink signal processors 315, 325. One antenna may be an antenna for uplink, and the other antenna may be an antenna for downlink.

Figure 16:
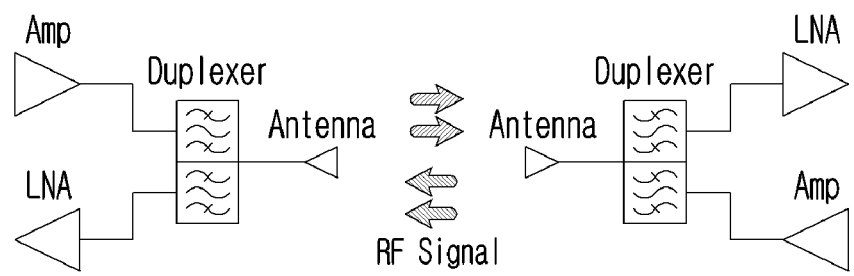
FIG. 16 is a view illustrating a variation example of the antenna structure shown in FIG. 15.

However, as shown in FIG. 16, one antenna may be provided in each of the uplink/downlink signal processors 315, 325, and uplink and downlink may be branched by using a duplexer.

The embodiment will be described by referring back to FIG. 14.

The upper magnet 312-1 of the external module 310 may be coupled with the upper magnet 322-1 of the internal module 320, and the lower magnet 312-2 of the external module 310 may be coupled with the lower magnet 322-2 of the internal module 320. Accordingly, the external module 310 may be fixed to an outside of the glass window, and the internal module 320 may be fixed to an inside of the glass window.

The power supply 313 of the external module 310 may supply necessary power to the external module 310. The wireless power transmission module 314 of the external module 310 may transmit power supplied by the power supply 313 to the wireless power reception module 324 of the internal module 320.

The power that the wireless power reception module 324 receives from the wireless power transmission module 314 may be used as power necessary for the internal module 320.

Up to now, the repeater which provides a beamforming function by using the hybrid butler matrix has been described with reference to preferred embodiments.

In the above-described embodiments, a hybrid butler matrix structure is applied to an existing repeater, so that a beamforming function and easiness of manufacturing can be provided, heat emission and power consumption can be reduced, and a cost of production of a repeater can be reduced.

In addition, signal lines and power lines which are used in an existing repeater in a communication service using millimeter waves can be removed, so that easiness of installing a repeater and service performance can be enhanced.

Due to the repeater structure of the new method according to embodiments of the present disclosure, a design of a beamforming antenna module can be simplified, and power consumption and heat emission can be reduced in comparison with an existing analogue beamforming method.

In addition, a communication service in a building can be easily extended by using a glass window or a thin wall.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A repeater comprising:
   a first hybrid butler matrix configured to perform beamforming of a MIMO antenna for transmitting and receiving a base station signal;
   a second hybrid butler matrix configured to perform beamforming of a MIMO antenna for transmitting and receiving a user terminal signal; and
   a signal processor configured to amplify a signal to be transmitted and received through the first hybrid butler matrix and the second hybrid butler matrix,
   wherein the first hybrid butler matrix is provided in an external module positioned on an outdoor area, and the second hybrid butler matrix is provided in an internal module positioned on an indoor area, and
   wherein the repeater further comprises:
   an external magnet provided in the external module to be coupled with an internal magnet provided in the internal module; and
   an internal magnet provided in the internal module to be coupled with the external magnet provided in the external module.

2. The repeater of claim 1, wherein the first hybrid butler matrix comprises:
   a hybrid butler matrix configured to receive a signal from a base station; and
   a hybrid butler matrix configured to transmit a signal to the base station, and
   wherein the second hybrid butler matrix comprises:
   a hybrid butler matrix configured to receive a signal from a user terminal; and
   a hybrid butler matrix configured to transmit a signal to the user terminal.

3. The repeater of claim 1, wherein the signal processor comprises:
   a downlink signal processor configured to amplify a downlink signal received from the first hybrid butler matrix, and to transmit the amplified signal to the second hybrid butler matrix; and
   an uplink signal processor configured to amplify an uplink signal received from the second hybrid butler matrix, and to transmit the amplified signal to the first hybrid butler matrix, and
   wherein the repeater comprises:
   a first circulator configured to selectively connect the first hybrid butler matrix to the downlink signal processor or the uplink signal processor; and
   a second circulator configured to selectively connect the second hybrid butler matrix to the downlink signal processor or the uplink signal processor.

4. The repeater of claim 1, wherein the external magnet comprises:
   an upper magnet positioned on an upper portion of the external module; and
   a lower magnet positioned on a lower portion of the external module, and
   wherein the internal magnet comprises:
   an upper internal magnet positioned on an upper portion of the internal module; and
   a lower internal magnet positioned on a lower portion of the internal module.

5. The repeater of claim 1, wherein the signal processor comprises:
   an external signal processor provided in the external module; and
   an internal signal processor provided in the internal module, and
   wherein the external signal processor and the internal signal processor are respectively provided with one antenna for transmitting a downlink signal and one antenna for transmitting an uplink signal.

6. The repeater of claim 1, wherein the signal processor comprises:
   an external signal processor provided in the external module; and
   an internal signal processor provided in the internal module, and
   wherein the external signal processor and the internal signal processor are respectively provided with one antenna for transmitting a signal to each other.

7. The repeater of claim 1, further comprising:
   a power supply provided in the external module to supply power to the external module;
   a wireless power transmission module provided in the external module to wirelessly transmit power supplied by the power supply; and
   a wireless power reception module provided in the internal module to receive power from the wireless power transmission module and to supply power to the internal module.

8. The repeater of claim 1, wherein the external module is positioned on an outside of a glass window of a building, and
   wherein the internal module is positioned on an inside of the glass window of the building.

9. A repeating method comprising:
   performing, by a first hybrid butler matrix, beamforming of a MIMO antenna for transmitting and receiving a base station signal;
   performing, by a second hybrid butler matrix, beamforming of a MIMO antenna for transmitting and receiving a user terminal signal; and
   amplifying, by a signal processor, a signal to be transmitted and received through the first hybrid butler matrix and the second hybrid butler matrix,
   wherein the first hybrid butler matrix is provided in an external module positioned on an outdoor area, and the second hybrid butler matrix is provided in an internal module positioned on an indoor area, and
   wherein an external magnet provided in the external module is to be coupled with an internal magnet provided in the internal module, and an internal magnet provided in the internal module is to be coupled with the external magnet provided in the external module.

10. A repeater comprising:
a first hybrid butler matrix configured to perform beamforming of a MIMO antenna for transmitting and receiving a first signal;
a second hybrid butler matrix configured to perform beamforming of a MIMO antenna for transmitting and receiving a second signal;
a signal processor configured to amplify a signal to be transmitted and received through the first hybrid butler matrix and the second hybrid butler matrix; and
a controller configured to control beamforming of the first hybrid butler matrix and the second hybrid butler matrix,
wherein the first hybrid butler matrix is provided in an external module positioned on an outdoor area, and the second hybrid butler matrix is provided in an internal module positioned on an indoor area, and
wherein the repeater further comprises:
an external magnet provided in the external module to be coupled with an internal magnet provided in the internal module; and
an internal magnet provided in the internal module to be coupled with the external magnet provided in the external module.

11. The method of claim 9, wherein the first hybrid butler matrix comprises:
a hybrid butler matrix configured to receive a signal from a base station; and
a hybrid butler matrix configured to transmit a signal to the base station, and
wherein the second hybrid butler matrix comprises:
a hybrid butler matrix configured to receive a signal from a user terminal; and
a hybrid butler matrix configured to transmit a signal to the user terminal.

12. The method of claim 9, further comprises:
amplifying, by a downlink signal processor, a downlink signal received from the first hybrid butler matrix, and to transmit the amplified signal to the second hybrid butler matrix;
amplifying, an uplink signal processor, an uplink signal received from the second hybrid butler matrix, and to transmit the amplified signal to the first hybrid butler matrix.

13. The method of claim 12, further comprises:
selectively connecting, by a first circulator, the first hybrid butler matrix to the downlink signal processor or the uplink signal processor; and
selectively connecting, by a second circulator, the second hybrid butler matrix to the downlink signal processor or the uplink signal processor.

14. The method of claim 9, wherein the external magnet comprises:
an upper magnet positioned on an upper portion of the external module; and
a lower magnet positioned on a lower portion of the external module, and wherein the internal magnet comprises:
an upper internal magnet positioned on an upper portion of the internal module; and
a lower internal magnet positioned on a lower portion of the internal module.

15. The method of claim 9, wherein the signal processor comprises:
an external signal processor provided in the external module; and
an internal signal processor provided in the internal module, and
wherein the external signal processor and the internal signal processor are respectively provided with one antenna for transmitting a downlink signal and one antenna for transmitting an uplink signal.

16. The method of claim 9, wherein the signal processor comprises:
an external signal processor provided in the external module; and
an internal signal processor provided in the internal module, and
wherein the external signal processor and the internal signal processor are respectively provided with one antenna for transmitting a signal to each other.

17. The method of claim 9, wherein
a power supply is provided in the external module to supply power to the external module,
a wireless power transmission module is provided in the external module to wirelessly transmit power supplied by the power supply, and
a wireless power reception module is provided in the internal module to receive power from the wireless power transmission module and to supply power to the internal module.

18. The method of claim 9, wherein the external module is positioned on an outside of a glass window of a building, and the internal module is positioned on an inside of the glass window of the building.

19. The repeater of claim 11, wherein the signal processor comprises:
a downlink signal processor configured to amplify a downlink signal received from the first hybrid butler matrix, and to transmit the amplified signal to the second hybrid butler matrix; and
an uplink signal processor configured to amplify an uplink signal received from the second hybrid butler matrix, and to transmit the amplified signal to the first hybrid butler matrix.

20. The repeater of claim 19, wherein the repeater comprises:
a first circulator configured to selectively connect the first hybrid butler matrix to the downlink signal processor or the uplink signal processor; and
a second circulator configured to selectively connect the second hybrid butler matrix to the downlink signal processor or the uplink signal processor.

* * * * *